(12) United States Patent
Guerrero et al.

(10) Patent No.: US 7,906,861 B2
(45) Date of Patent: Mar. 15, 2011

(54) HARVESTING ENERGY IN REMOTE LOCATIONS

(75) Inventors: Julio C. Guerrero, Cambridge, MA (US); Jahir A. Pabon, Wellesley, MA (US); Francois M. Auzerais, Houston, TX (US); Kuo Chiang Chen, Lexington, MA (US); Kevin J. Forbes, Houston, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 548 days.

(21) Appl. No.: 11/946,302

(22) Filed: Nov. 28, 2007

(65) Prior Publication Data
US 2009/0134631 A1 May 28, 2009

(51) Int. Cl.
*H02P 9/04* (2006.01)
*H02K 35/00* (2006.01)
(52) U.S. Cl. .................... 290/1 R; 290/1 A; 310/12
(58) Field of Classification Search ............. 290/1 R, 290/43, 54, 1 A; 310/12, 15, 36
See application file for complete search history.

(56) References Cited

U.S. PATENT DOCUMENTS

| | | | |
|---|---|---|---|
| 3,371,234 A | 2/1968 | Cady | |
| 3,938,020 A | 2/1976 | Bourke | |
| 4,387,318 A | 6/1983 | Kolm et al. | |
| 4,518,888 A * | 5/1985 | Zabcik | 310/334 |
| 5,578,877 A * | 11/1996 | Tiemann | 310/15 |
| 5,839,508 A * | 11/1998 | Tubel et al. | 166/65.1 |
| 6,220,719 B1 * | 4/2001 | Vetorino et al. | 362/192 |
| 6,257,355 B1 * | 7/2001 | Baker | 175/50 |
| 6,424,079 B1 | 7/2002 | Carroll | |
| 6,433,465 B1 | 8/2002 | McKnight et al. | |
| 6,504,258 B2 * | 1/2003 | Schultz et al. | 290/1 R |
| 6,532,740 B1 | 3/2003 | Sullivan | |
| 6,768,214 B2 * | 7/2004 | Schultz et al. | 290/1 R |
| 6,812,583 B2 * | 11/2004 | Cheung et al. | 290/1 R |
| 6,848,503 B2 * | 2/2005 | Schultz et al. | 166/66.5 |
| 6,853,103 B2 * | 2/2005 | Moriyasu | 310/81 |

(Continued)

FOREIGN PATENT DOCUMENTS
GB 1116451 6/1968
(Continued)

OTHER PUBLICATIONS

Patent Cooperation Treaty, International Search Report, dated Sep. 25, 2009, 4 pages.

*Primary Examiner* — Nicholas Ponomarenko
(74) *Attorney, Agent, or Firm* — Brigid Laffey; Vincent Loccisano; James McAleenan

(57) ABSTRACT

Electrical energy is produced at a remote site by converting kinetic energy from the environment. The kinetic energy may include vibrations and flow of fluid. In some embodiments the kinetic energy causes magnets to move with respect to coils in order to produce electrical energy. An anchor holds the device in place, and permits the device to be retrieved or relocated. A flexure or compliant membrane that helps determine the position of the magnets with respect to coils is defined by mechanical properties that permit oscillatory movement in response to the inputted kinetic energy. The device can be tuned to different vibration and flow regimes in order to enhance energy conversion efficiency. Further, the device may be mounted in a secondary flow path such as a side package or annular tube.

24 Claims, 9 Drawing Sheets

U.S. PATENT DOCUMENTS

| | | |
|---|---|---|
| 6,856,036 B2 | 2/2005 | Belinksy |
| 7,116,036 B2 | 10/2006 | Balasubramaniam et al. |
| 7,132,597 B2 * | 11/2006 | Hosler .......................... 84/723 |
| 7,246,660 B2 * | 7/2007 | Fripp et al. .................. 166/65.1 |
| 7,266,269 B2 | 9/2007 | Koste et al. |
| 7,293,411 B2 | 11/2007 | Fitch et al. |
| 7,345,372 B2 * | 3/2008 | Roberts et al. ............... 290/1 R |
| 7,498,681 B1 * | 3/2009 | Kellogg et al. ................ 290/1 R |
| 7,498,682 B2 * | 3/2009 | Lemieux ....................... 290/1 R |
| 2005/0051323 A1 | 3/2005 | Fripp et al. |
| 2005/0134149 A1 | 6/2005 | Deng et al. |
| 2006/0063522 A1 | 3/2006 | McFarland |
| 2006/0093790 A1 | 5/2006 | Harris |
| 2006/0175937 A1 | 8/2006 | Clingman et al. |
| 2007/0188046 A1 | 8/2007 | Chaillout et al. |
| 2007/0256827 A1 | 11/2007 | Guerrero et al. |

FOREIGN PATENT DOCUMENTS

| | | |
|---|---|---|
| GB | 2419362 A | 4/2006 |
| WO | 2005036728 A2 | 4/2005 |
| WO | 2006085869 A | 8/2006 |
| WO | 2006093790 A2 | 9/2006 |
| WO | 2007102000 A | 9/2007 |

* cited by examiner

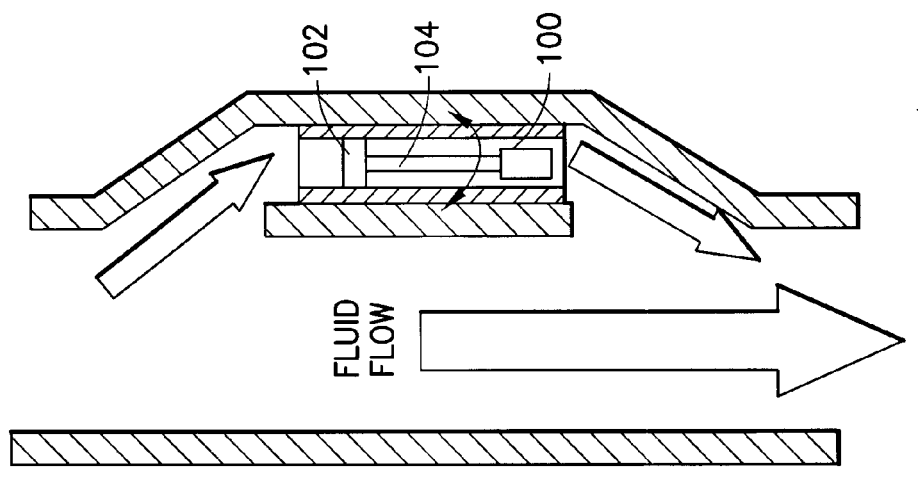
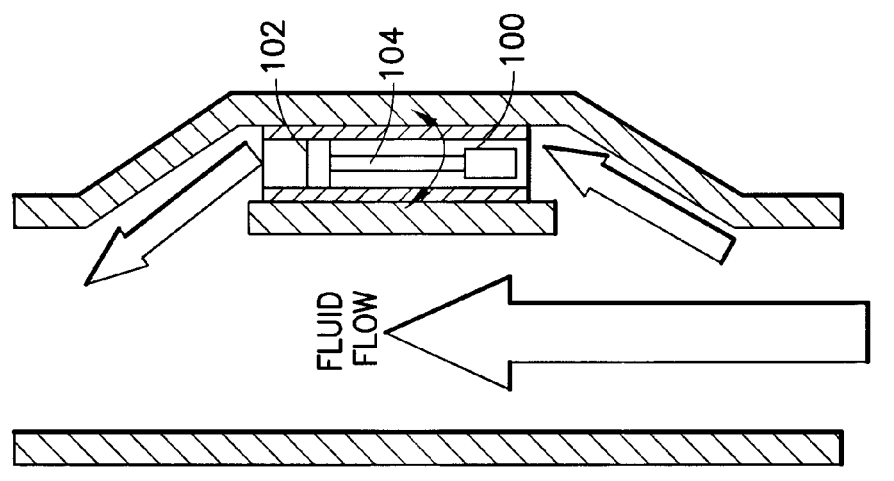

HARVESTING ENERGY IN REMOTE LOCATIONS

FIELD OF THE INVENTION

This invention is generally related to harvesting energy, and more particularly to converting kinetic energy into electrical energy to power equipment at a close or remote location.

BACKGROUND OF THE INVENTION

In order to recover natural resources from subterranean formations it is often necessary to perform tasks related to exploration, monitoring, maintenance and construction in remote locations that are either difficult or impractical for personnel to reach directly. For example, boreholes may be drilled tens of thousands of meters into the earth, and in the case of offshore drilling, the borehole may be thousands of meters under water. One of the technical challenges to performing tasks in such remote locations is providing power to equipment. It is known to power downhole and undersea equipment via either stored energy or wireline connection to the surface. However, both of these techniques have disadvantages. For example, a wireline connection to the surface limits that distance at which the equipment can operate relative to the energy source, and may require a relatively significant portion of the limited volume of a borehole. Using stored energy avoids some of the disadvantages of a wireline connection to the surface, but relatively little energy can be stored in comparison to requirements because of size limitations. For example, the available volume in a borehole environment is small. Further, both wireline connection to the surface and stored energy techniques require the presence of operators, e.g., a surface vessel to either provide the wireline energy or recharge the energy storage means. Various techniques associated with energy production are described below.

U.S. Pat. No. 3,938,020 A, CHARGER CIRCUIT FOR ACCESSORY BATTERY, describes a charging circuit adapted to harvest excess energy from a resonating power circuit. Energy is inductively transferred from the power circuit to the charging circuit, thereby allowing the circuits to remain electrically isolated. The charging circuit utilizes gate controlled thyristors for coupling the harvested energy to a battery, and includes means for gating the thyristors at the proper time with respect to the resonant cycle in the power circuit.

U.S. Pat. No. 4,387,318, PIEZO-ELECTRIC FLUID ELECTRIC GENERATOR, describes a bending element that generates electrical power when deformed by fluid flow. The bending element is fixed to mounting means at one end and to a fin-like driving means at the other end.

U.S. Pat. No. 5,839,508, DOWNHOLE APPARATUS FOR GENERATING ELECTRICAL POWER IN A WELL, describes a power generating device which is attached to a side passageway of production tubing. An electrical generator in the side passageway is used to generate electrical energy using the fluid flow. A flow diverter is used to control the distribution of fluid flow between the main passageway of the production tubing and the side passageway.

U.S. Pat. No. 6,504,258 B2, VIBRATION BASED DOWNHOLE POWER GENERATOR, describes production tubing having integral power generating assemblies. The power generating assemblies are attached to a member of the production tubing that is caused to vibrate by fluid flow. The power generating assemblies may include magnet and coil arrangements or a piezoelectric material. The movement of the member is used to generate electrical energy.

U.S. Pat. No. 6,532,740 B1, GENERATOR EMPLOYING THE CORIOLIS EFFECT, describes a system for employing the Coriolis effect for the generation and storage of energy. The system includes a vortex chamber for rotational acceleration of superheated, supersaturated water vapor and heated air. A water intake assembly is adapted to deliver a directed flow of superheated water vapor to a lower portion of the vortex chamber while the air intake assembly is adapted to deliver a flow of heated air to the lower portion of the vortex chamber. The air intake assembly includes an electrical generator operable by airflow drawn from the air intake assembly.

U.S. Pat. No. 6,768,214, VIBRATION BASED POWER GENERATOR, describes a device with a member that is displaced in response to fluid flow. The displacement of the member is used to induce strain on a piezoelectric material, and thereby generate electricity.

U.S. Pat. No. 6,856,036 B2, INSTALLATION FOR HARVESTING KINETIC ENERGY OF OCEAN CURRENTS IN DEEPWATER, describes utilization of a semi-submersible platform and multiple, vertically oriented Darrieus-type hydraulic turbines with funnels. The turbines are located below sea level at a depth sufficient to isolate them from wave action. Electric power generators are located on a structure above water, and operate to provide electric power which is transmitted to the shore. One of the embodiments is designed to harvest energy from tidal currents in deepwater.

U.S. Pat. No. 7,116,036 B2, ENERGY HARVESTING SYSTEM, describes a device that collects acoustic energy and transforms it into electrical energy for use by a sensor.

US 20060133733 A1, POWER HARVESTING, describes a device having an electromagnetic (EM) radiation intensity modulator configured to receive EM radiation from at least one source and an energy converter for converting the EM radiation into electrical energy.

US 20060130476 A1, ENERGY SCAVENGERS WHICH ADJUST THEIR FREQUENCY BY ALTERING LIQUID DISTRIBUTIONS ON A BEAM, describes a system with a selectively configurable beam, the distribution of mass of which can be selectively altered by adjusting one or more characteristics. Specific strategies utilizing continuous electro-wetting and selective formation or movement of gases in liquid are disclosed. The selectively configurable beams are used in systems for harvesting vibrational energy from vibrating bodies.

US 20060063522 A, SELF-POWERING AUTOMATED BUILDING CONTROL COMPONENTS, describes a network of wireless radios for controlling operation of equipment, and locating assets and personnel. The wireless radios may be powered by energy generators that scavenge energy from the building, building equipment, or building environment. For example, the energy generators may utilize micro-electro-mechanical components or piezoelectric materials driven by vibrations. The energy generators may alternatively generate electrical energy from light, thermal, kinetic, radio frequency, movement or other forms of energy.

WO 2006093790 A2, WIND FIN: ARTICULATED, OSCILLATING WIND POWER GENERATOR, describes a system for harvesting the kinetic energy of a fluid flow for power generation by using an articulated airfoil capable of form inversion. Pivoted about a mast, the airfoil moves in an oscillatory manner in response to aerodynamic lift forces. The airfoil has a fixed configuration, and does not utilize mechanical trimming or aeroelastic flutter.

US 20060175937 A1, STRAIN ENERGY SHUTTLE APPARATUS AND METHOD FOR VIBRATION

ENERGY HARVESTING, describes a device for low frequency vibration energy harvesting (VEH) with actuators requiring a low deflection force. The device includes a piezo flexure that is loaded with a compressive pre-load force to place the piezo flexure under compression. The compressive pre-load force flexes the piezo flexure into one of two stable positions, these positions being offset on opposite sides of a longitudinal centerline representing the position of the piezo flexure that would be produced without application of the compressive pre-load force. The compressive pre-load effectively provides a negative spring constant which "softens" the piezo flexure and enhances responsiveness to low frequency vibration energy.

GB1116451 A, METHOD OF AND APPARATUS FOR TRANSMITTING ENERGY BY PRESSURE OSCILLATIONS IN A FLUID, describes a fluid-pressure apparatus with a branch duct of a gas or liquid-filled duct through which oscillations are transmitted by a mechanical oscillator to a receiver which is connected to a cylinder having an adjustable piston.

SUMMARY OF THE INVENTION

In accordance with one embodiment of the invention, an apparatus for converting kinetic energy to electrical energy comprises an energy conversion module having an attachment member and first and second components which provide electrical energy when moved relative to each other, the first component being fixed in position relative to the attachment member and the second component being free to move in at least one dimension within a predetermined range relative to the attachment member; an anchor that is fixed in place when deployed; and a flexure member connecting the anchor with the energy conversion module, the flexure characterized by mechanical properties that permit the energy conversion module to move in an oscillatory manner in response to external stimuli, whereby the first and second components are moved relative to each other and electrical energy is produced.

In accordance with another embodiment of the invention, a method for converting kinetic energy to electrical energy comprises, with an energy conversion module held in place by an anchor, and connected to the anchor by a flexure member, translating environmental kinetic energy into motion of a first component relative to a second component to induce generation of electrical energy, the first component being fixed in position relative to an attachment member of the energy conversion module and the second component being free to move in at least one dimension within a predetermined range relative to the attachment member, the flexure characterized by mechanical properties that permit the energy conversion module to move in an oscillatory manner in response to external stimuli, whereby the first and second components are moved relative to each other and electrical energy is produced.

In accordance with another embodiment of the invention, apparatus for converting kinetic energy to electrical energy comprises an energy conversion module having an attachment member and first and second components which provide electrical energy when moved relative to each other, the first component being fixed in position relative to the attachment member; an anchor that is fixed in place when deployed; a rigid flexure member connecting the anchor with the energy conversion module; and a compliant membrane attached to the second component, the compliant membrane characterized by mechanical properties that permit movement in an oscillatory manner in response to external stimuli, whereby the first and second components are moved relative to each other and electrical energy is produced.

In accordance with another embodiment of the invention, a method for converting kinetic energy to electrical energy comprises, with an energy conversion module held in place by an anchor, and connected to the anchor by a rigid flexure member, translating environmental kinetic energy into motion of a first component relative to a second component to induce generation of electrical energy, the first component being fixed in position relative to an attachment member of the energy conversion module and the second component being attached to a compliant membrane characterized by mechanical properties that permit the energy second component to move in an oscillatory manner in response to external stimuli, whereby the first and second components are moved relative to each other and electrical energy is produced.

One advantage of the invention is that electrical energy can be produced in a remote environment. The energy harvesting device does not rely on a physical connection with a device at the surface for power. Further, because the source of kinetic energy is not dependent on a limited reservoir of fuel or battery power, the device can produce electrical energy continuously.

Further features and advantages of the invention will become more readily apparent from the following detailed description when taken in conjunction with the accompanying Drawing.

BRIEF DESCRIPTION OF THE DRAWING

FIGS. 3 through 6 illustrate orientation of the energy harvesting device of FIG. 1 with respect to the direction of fluid flow.

DETAILED DESCRIPTION

The particulars described herein are by way of example for purposes of discussion of the illustrated embodiments of the present invention in order to provide what is believed to be a useful and readily understood description of the principles and conceptual aspects of the invention. No attempt is made to show structural aspects of the invention in more detail than is necessary for a fundamental understanding of the invention.

The invention may be implemented in various different embodiments of a device for converting external stimuli in the form of kinetic energy from the surrounding environment into electrical energy. The embodiments are described below in the context of the source of kinetic energy being vibrations caused by normal operations associated with creation and production of a petrochemical recovery well, fluid flow through a borehole, or both. However, the invention is not limited to petrochemical wells.

Figure 1:
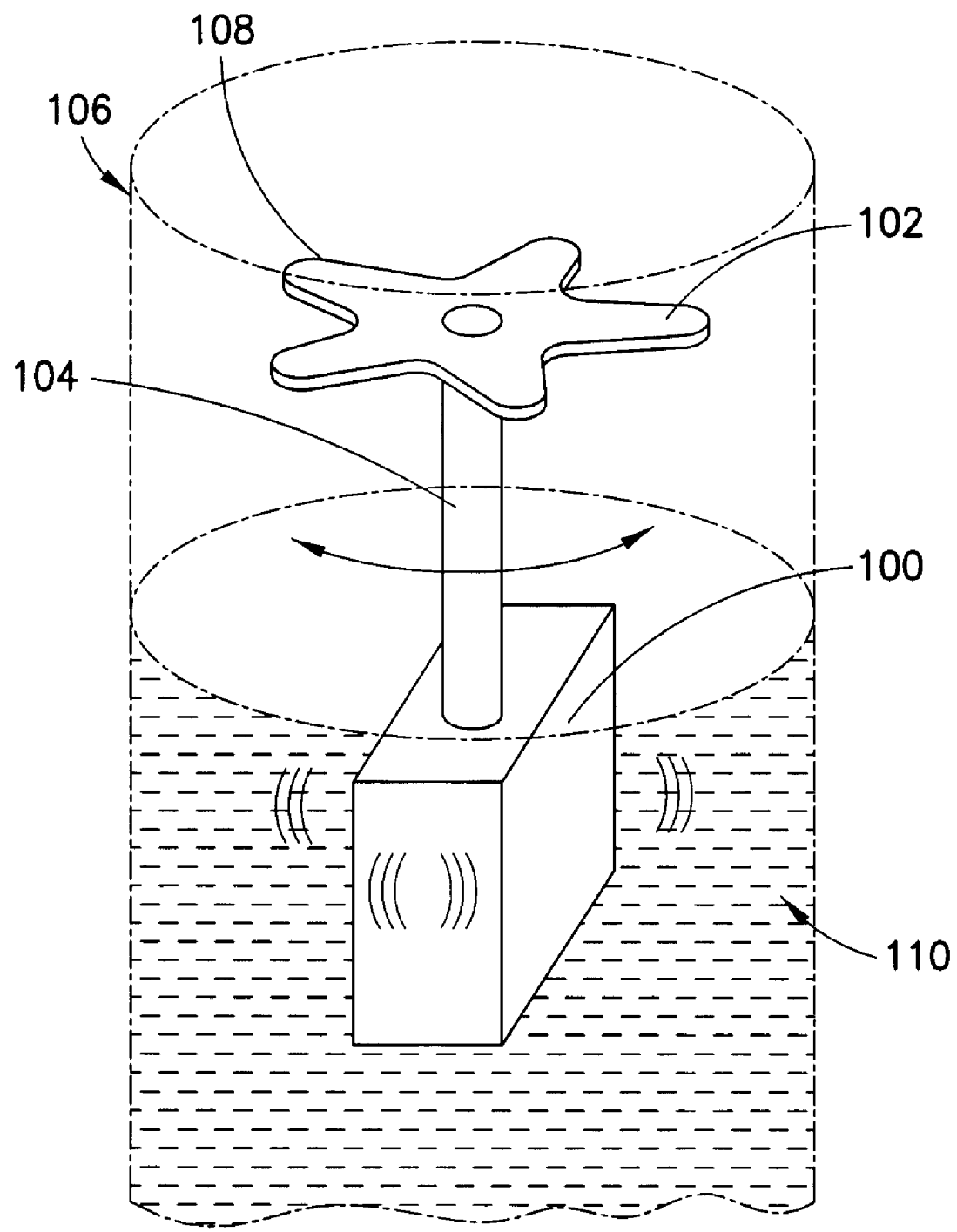
FIG. 1 illustrates an energy harvesting device.

Referring to FIG. 1, a first exemplary embodiment of an energy harvesting device includes an energy conversion module (100) which is connected to an anchor member (102) via a flexure (104). The energy conversion module (100) operates by using vibrations to cause motion of magnets with respect to coils, thereby inducing electrical current. The harvested vibrations may be caused by one or more types of potential sources. A first type of source is acoustic vibrations transmitted through the wall (106) to the energy conversion module (100) via the anchor (102) and flexure (104). These vibrations may be caused by operation of equipment such as pumps and BHAs. A second type of source is the flow of fluid (110) around the energy harvesting device. The fluid flow may be caused by pumping or natural pressure differential.

The anchor member (102) functions to secure the energy harvesting device to a surface of the surrounding environment, such as the inner wall (106) of a borehole, casing or production tubing. The anchor (102) may include an array of protruding tabs (108) disposed in a circle, the tips of which define a slightly greater diameter than the borehole or casing in which the energy harvesting device is being mounted. This configuration provides a friction fit against the borehole or pipe wall in order to temporarily or permanently anchor the energy harvesting device in place. Fluid flow is permitted between adjacent tabs (108). Although the anchor maintains a fixed position in the borehole, vibrations may be transmitted to the flexure (104) from the wall (106) through the anchor. Features of the anchor member could be as described in ANCHOR SYSTEM AND METHOD, US published application 20070256827, Ser. No. 11/273,758, filed Nov. 15, 2005, which is incorporated by reference.

Figure 2:
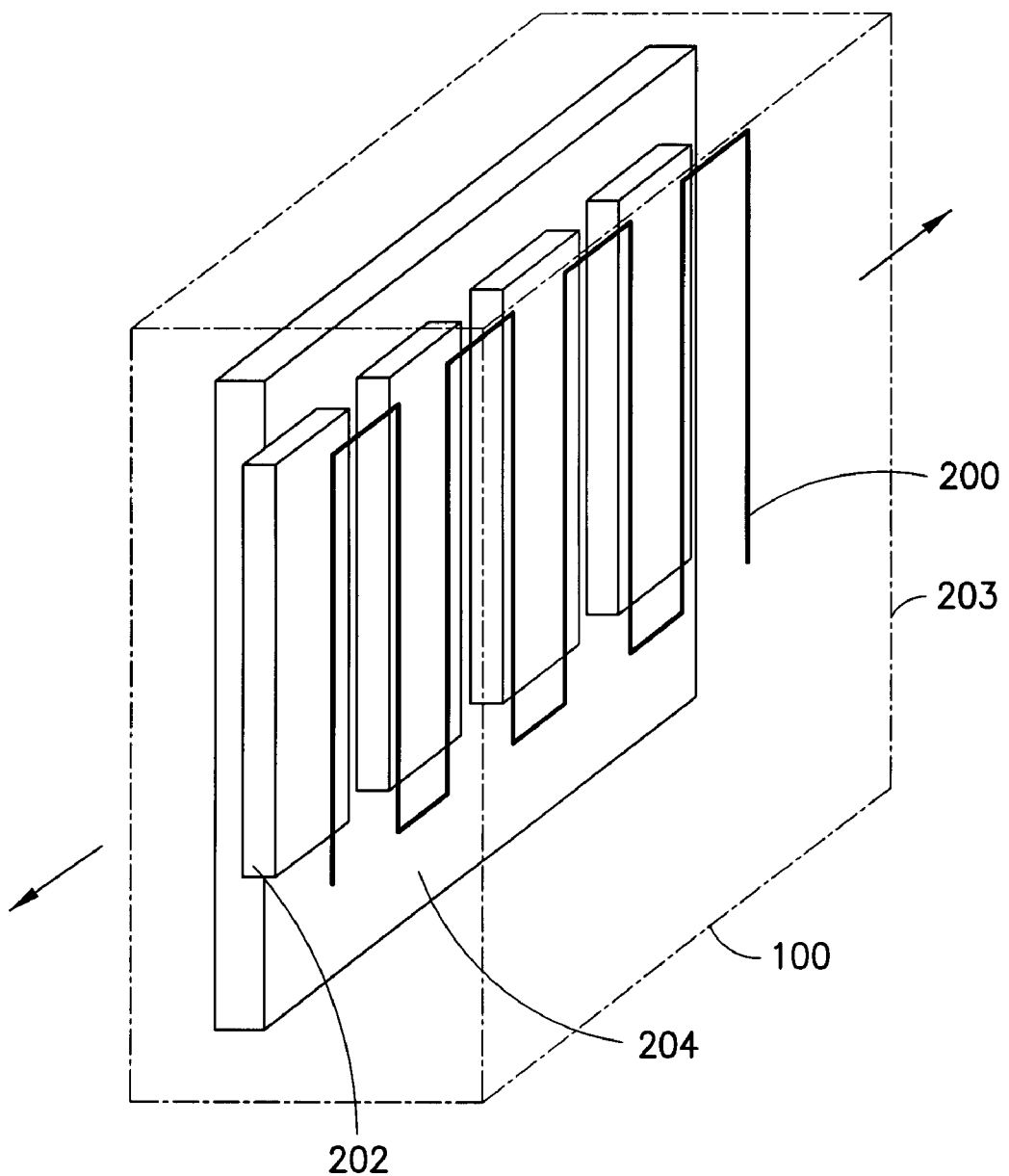
FIG. 2 illustrates the energy conversion module of the device of FIG. 1.

Referring now to FIGS. 1 and 2, the coils (200) and magnets (202) may be disposed in parallel planes within a housing (203) of the energy conversion module (100). In the illustrated example, the magnets (202) are held in a fixed position relative to each other by a plate (204). The plate is connected to the protective housing (203) by linear slide tracks which permit the magnets (202) to move in one dimension relative to the coils (200) as the energy conversion module moves, i.e., vibrates, relative to the anchor. Note that the relative motion of the magnets and coils is not necessarily similar to the relative motion of the energy conversion module relative to the anchor. In FIG. 1, the motion of the magnets (202) relative to the coils (200) is linear even if the motion of the energy conversion module relative to the anchor is non-linear. Thus, in response to kinetic energy in the form of either vibrations transmitted through the wall, or movement of fluid around the energy conversion module, or both, the coils move relative to the magnets, resulting in generation of electrical current. It should be noted that either the coils, the magnets, or both the coils and magnets could be caused to move while the other is maintained in a fixed position.

The flexure (104) and energy conversion module (100) may be selected to tune the energy harvesting device to the source of vibrations in order to enhance energy conversion efficiency. Although the anchor position is fixed, within the parameters of the deflection characteristics of the flexure (104), the energy conversion module (100) is free to move, i.e., the flexure functions as a cantilever. Due to uneven distribution of force of the flowing fluid on the energy harvesting module, or the transmission of vibrations to the energy harvesting module through the wall, anchor and flexure, or both, the energy conversion module can exhibit an oscillatory motion relative to the anchor. Depending on the implementation, the oscillatory motion may be one, two or three dimensional. The characteristics of the oscillatory motion of the energy conversion module are a function of the shape of the energy conversion module housing (203), the length of the flexure (104), the rigidity and resilience of the flexure, and other factors. These factors may be considered when designing an energy harvesting module for a particular purpose in order to efficiently produce a desired amount of electrical energy composed of a given range of current and voltage. For example, the force versus range characteristic of the flexure may be selected to be a harmonic of the anticipated energy source. Similarly, the range of motion permitted by the slide tracks in the energy harvesting module may be selected to accommodate the anticipate range of motion of the flexure, e.g., so the coils or magnets do not move all the way to the end of the slide track. The relative position of the device with respect to the direction of fluid flow and acoustic waves of vibrations also influences the manner in which the energy harvesting module moves, and may be taken into account when designing a device for a particular purpose.

Figure 6:
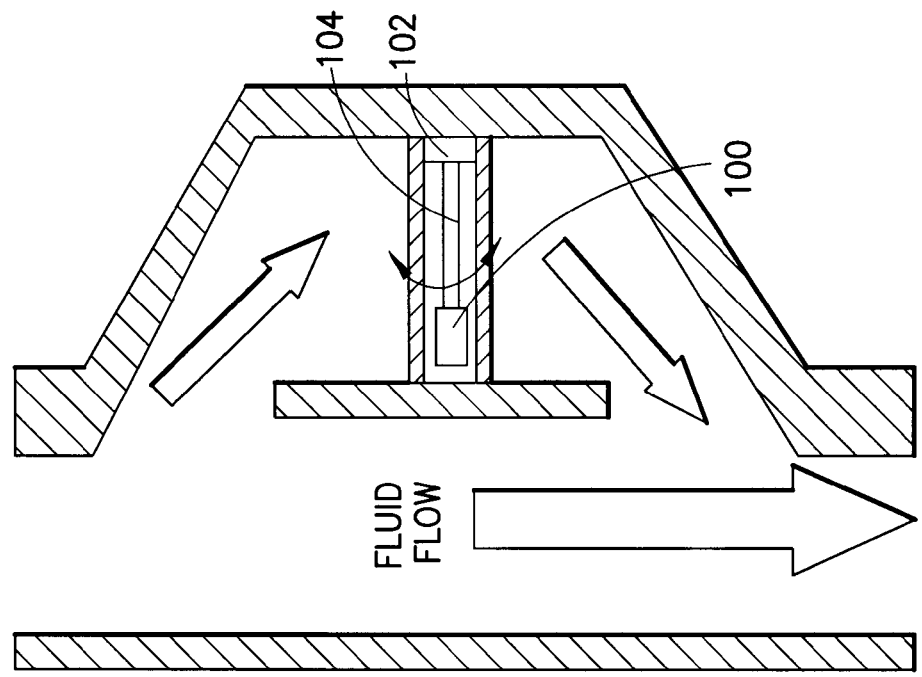
Figure 5:
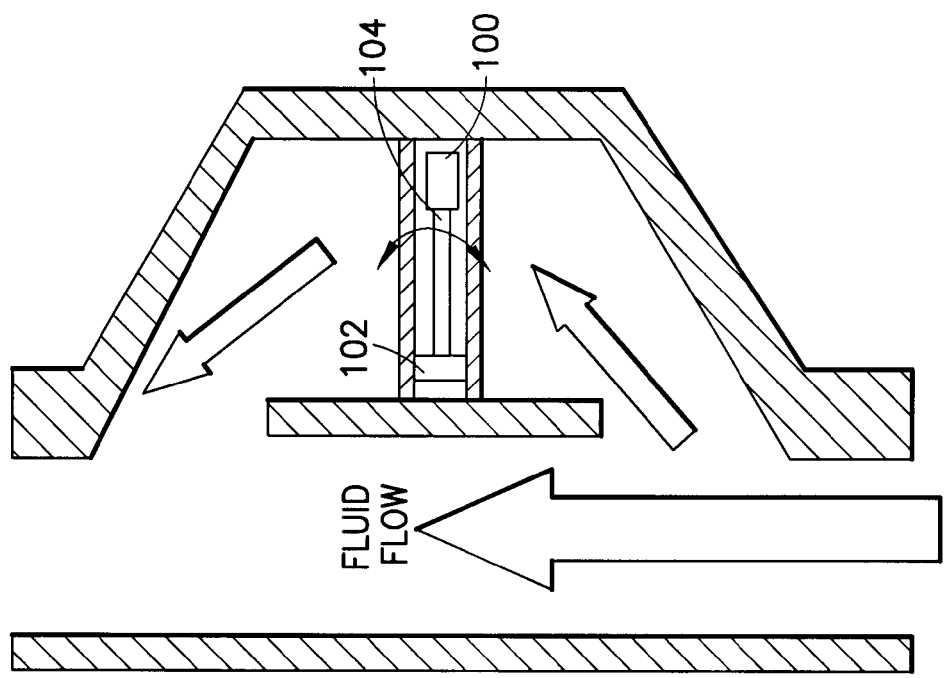

As shown in FIGS. 3 through 6, the energy harvesting device may be mounted in various different orientations with respect to the direction of fluid flow. In FIG. 3 the flexure (104) is lengthwise-parallel to the direction of fluid flow, and the energy conversion module (100) is upstream relative to the anchor (102). In FIG. 4 the flexure is again lengthwise-parallel to the direction of fluid flow, but the anchor (102) is upstream relative to the energy conversion module (100). In FIG. 5 the flexure (104) is lengthwise perpendicular to the direction of fluid flow, and the anchor (102) is relatively nearer to the main casing or production tubing than the energy conversion module (100). In FIG. 6 the flexure (104) is lengthwise perpendicular to the direction of fluid flow, and the energy conversion module (100) is relatively nearer to the main casing or production tubing than the anchor (102).

In each of the orientations illustrated in FIGS. 3 through 6 the energy harvesting device is disposed in an alternative fluid path ("side package") that is distinct from the main fluid path within casing or production tubing. An advantage of this deployment technique is that the energy harvesting device is less likely to impede future well operations in which operators might need to lower instruments into the well. However, the energy harvesting device could function in the main casing or production tubing. Another advantage of the side package deployment technique is that the device can be retrieved relatively easily, thereby enabling design and implementation of less costly energy harvesting devices.

Figure 7:
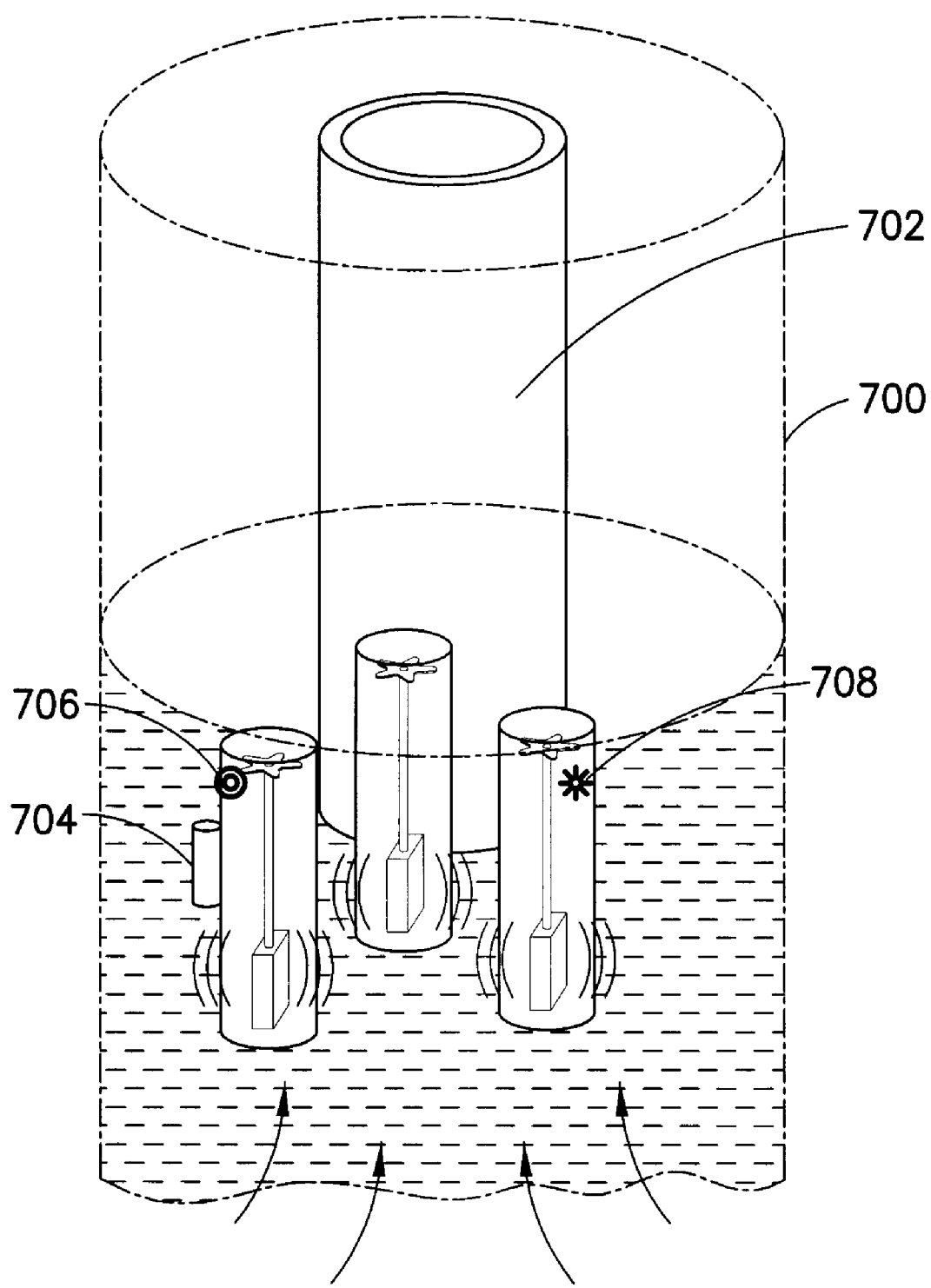
FIG. 7 illustrates deployment of multiple units of the energy harvesting device of FIG. 1.

Referring to FIG. 7, in various alternative embodiments the energy harvesting device can be enhanced with optional equipment. For example, and without limitation, the energy storage device may be enhanced with an energy storage module (704), a device (706) that utilizes the energy to perform a useful task such as data collection, and a transmitter (708) to send signals to other devices. An advantage of such enhanced embodiments is that the device more fully satisfies a given requirement, e.g., the device can be configured to power equipment to obtain information about fluid speed, or pressure, and transmit corresponding data to the surface. Comparative data may be obtained by utilizing multiple devices in series along the flow. Further, energy harvesting devices may operate simultaneously in both the casing (700) and the production tubing (702), e.g., to obtain comparative measurements from them or from sensors powered by them.

Figure 8:
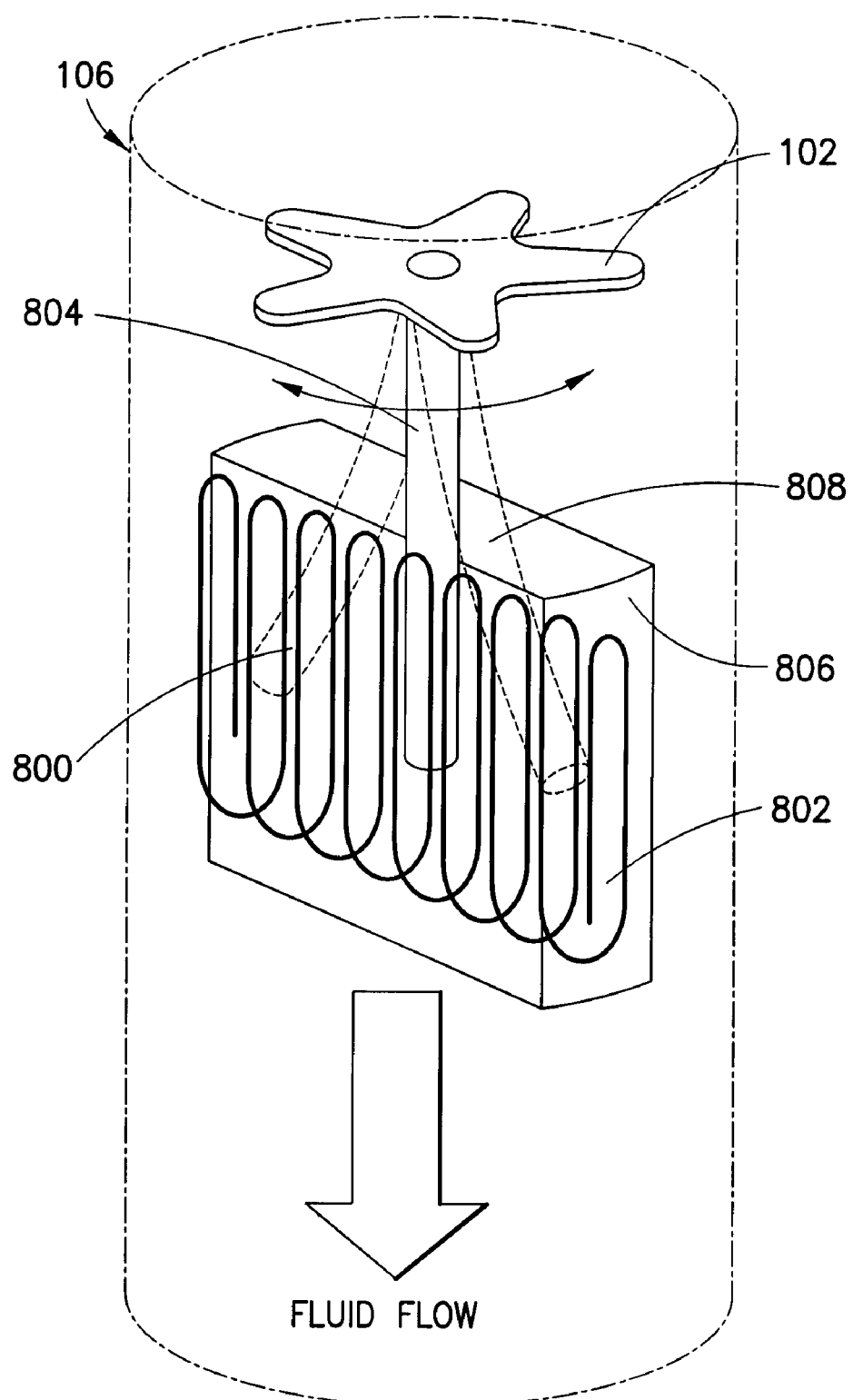
FIG. 8 illustrates an alternative embodiment of the energy harvesting device of FIG. 1.

FIG. 8 illustrates an alternative embodiment in which vibration of the magnets (800) (or alternatively coils (802)) is enhanced by interference with fluid flow. The embodiment includes and an anchor (102) as described above, a flexure (804) which connects the anchor (102) to a housing (806), and a compliant membrane (808), one end of which is connected to the anchor (102) or flexure (804), the other end of which is connected to the magnets. The flexure (804) is relatively rigid in comparison with the embodiment described above, so the housing (806) does not exhibit significant oscillatory motion. However, the compliant membrane (808) is flexible and resilient. Consequently, the magnets (800) which are disposed on a free end of the compliant membrane (808) are free to move in an oscillatory manner. Further, the compliant membrane facilitates the oscillatory motion of the magnets because the membrane interferes with fluid flow. In other words, fluids pass through the center of the housing (806), and cause the free end of the compliant membrane to move relative to the anchored end in an oscillatory manner. The oscillatory motion of the magnets (800) with respect to the coils (802) results in production of electrical energy. This alternative embodiment may be useful during completion, production and fracturing operations, oil/gas pipelines, and other instances in which the fluid flow regime is adequate. In more general terms, this embodiment has a flexure moving magnets with respect to coils. The magnets are moved by flow passing around the flexures containing them, and the coils are anchored with respect to the flow. In one embodiment the flow crosses through the middle of the device containing the magnets. The flow could pass outside it too.

The device may be tuned for a particular range of anticipated conditions. For example, the housing (806) shape may be configured to change the flow rate, and focus, concentrate, or dissipate the fluid flow. Further, the device may be configured to harvest energy only when the fluid flow is characterized by certain pre-defined conditions. Because the device can be tuned to particular flow characteristics, the state of the device (harvesting or not harvesting) is indicative of flow condition. Because this information can be of value, it may be useful to configure the device to signal information about the state of the energy harvesting device to other devices. Further, the energy harvesting device can be enhanced to obtain and provide more detailed information about fluid speed, or pressure, e.g., a measurement as opposed to a simple ON or OFF indication. Multiple devices may also be placed in series along the flow.

Figure 10:
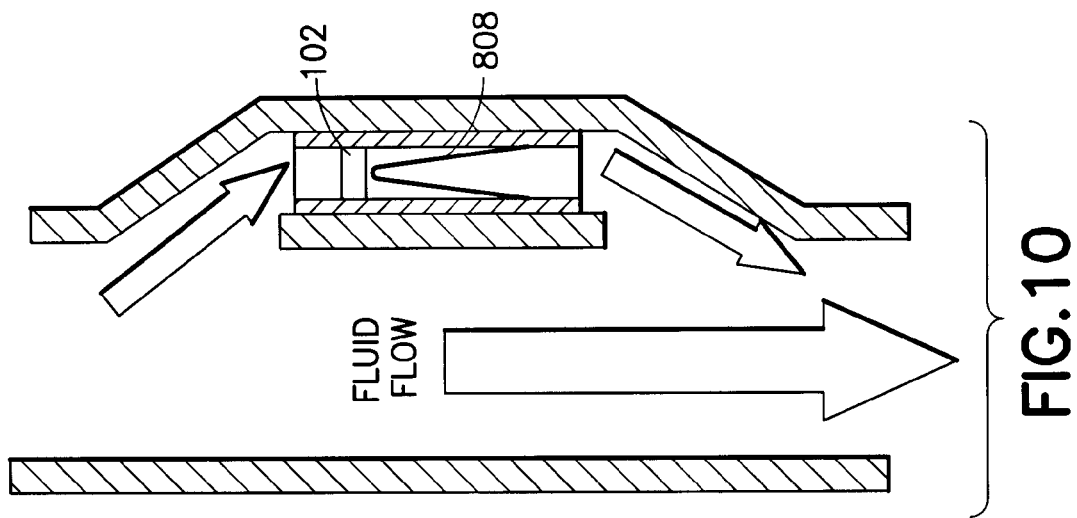
FIGS. 9 through 12 illustrate orientation of the energy harvesting device of FIG. 8 with respect to the direction of fluid flow.
Figure 9:
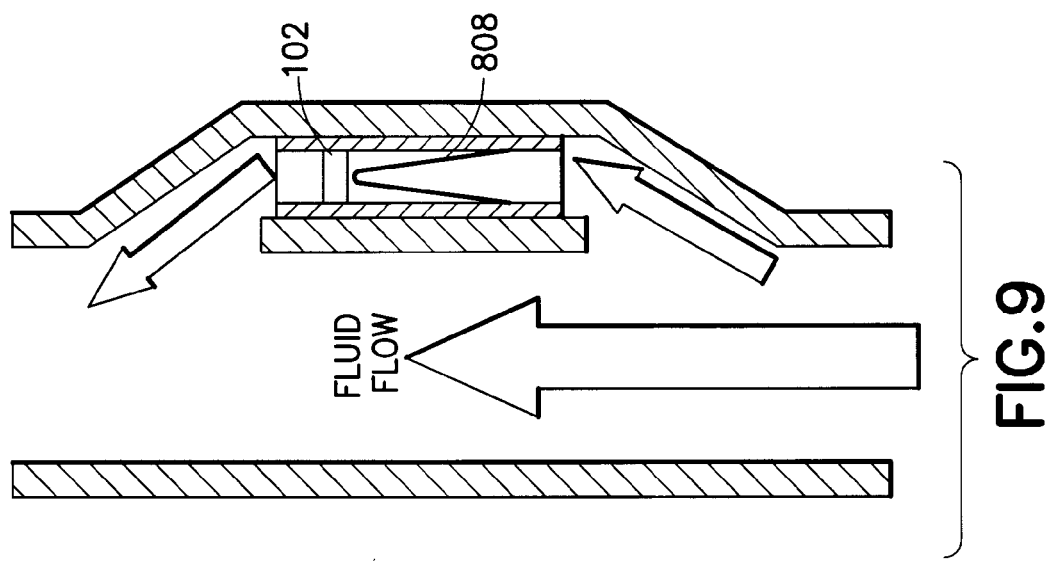
Figure 11:
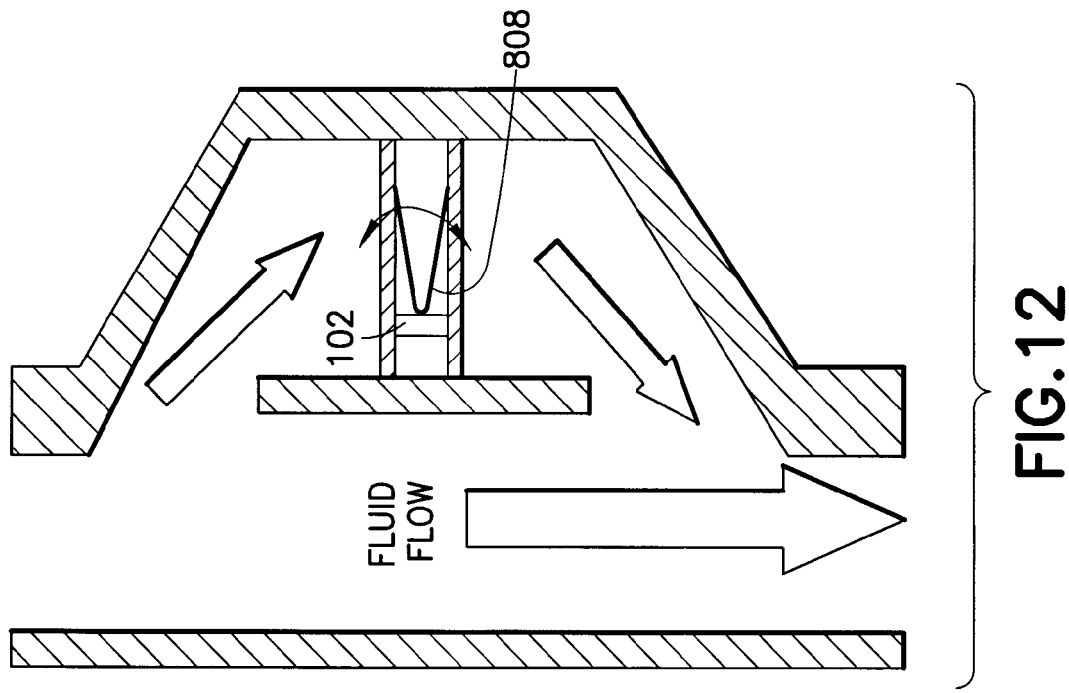
Figure 12:
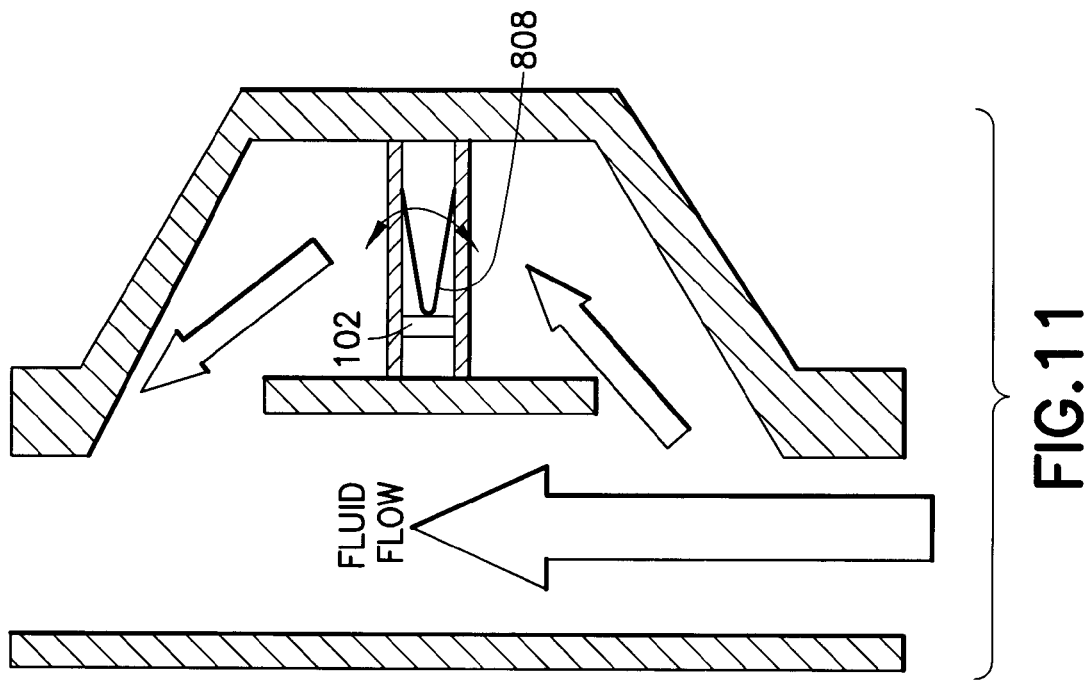

As shown in FIGS. 9 through 12, the alternative embodiment of the energy harvesting device can function to harvest energy, and optionally to sense flow speed, pressure, and other characteristics in various orientations with respect to the flow. In FIG. 9 the anchor (102) is downstream relative to the compliant membrane (808). In FIG. 10 the anchor (102) is upstream relative to the compliant membrane (808). In FIGS. 11 and 12 the energy harvesting device is transverse mounted relative to the direction of fluid flow such that the anchor (102) and compliant membrane (808) are disposed on an axis that is approximately perpendicular to the direction of fluid flow. The relative position of the anchored and free ends of the compliant membrane (808) with respect to the direction of fluid flow affect the manner in which vibrations are induced.

Figure 13:
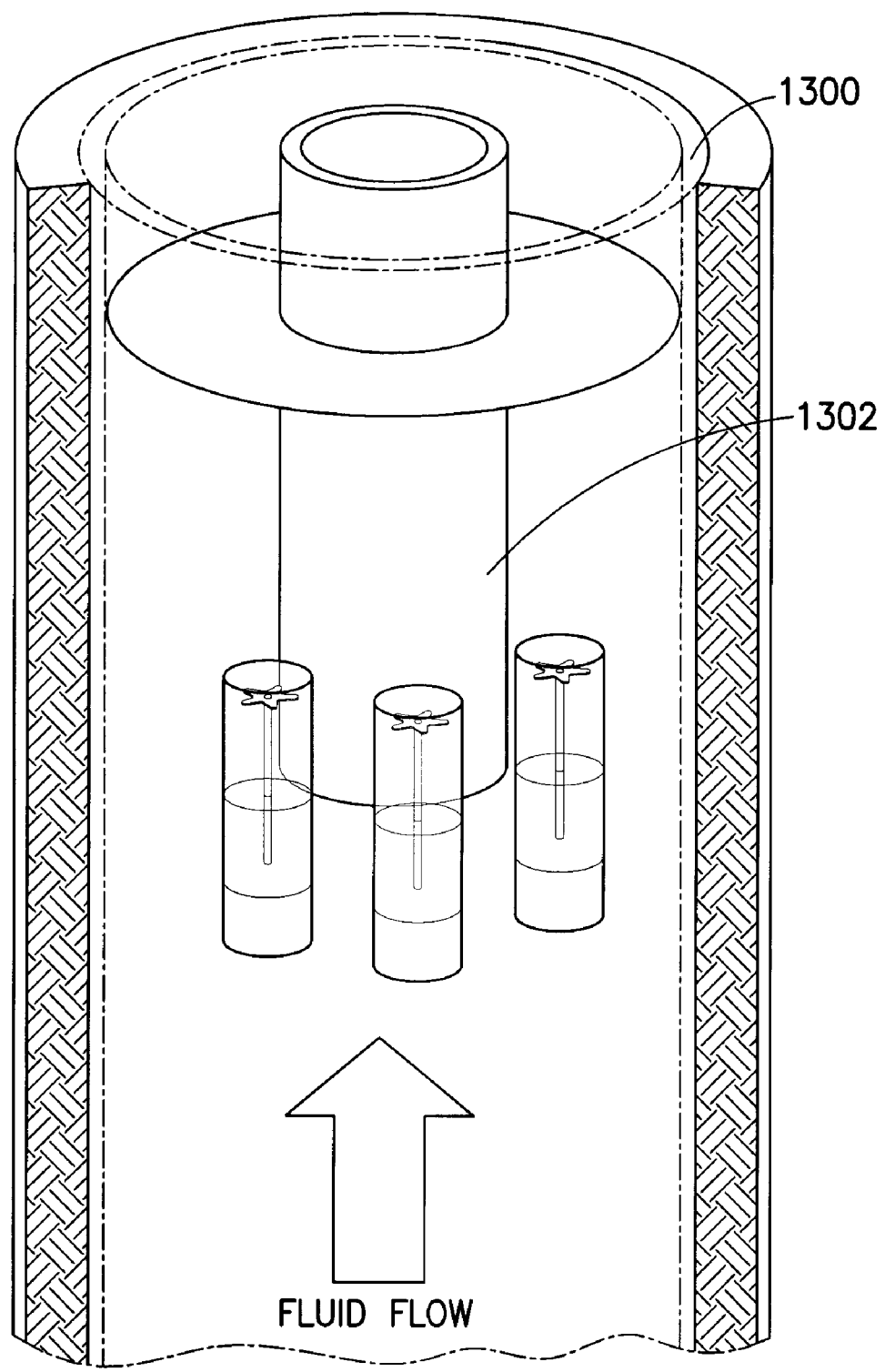
FIG. 13 illustrates deployment of multiple units of the energy harvesting device of FIG. 8.

Referring to FIG. 13, individual units of the energy harvesting device can be disposed in the completion string as part of a casing (1300) and as part of the tubing (1302). As already described with regard to other embodiments, optional enhancements include energy storage, utilizing the energy to perform a useful task such as data collection, and a transmitter to send signals to other devices.

It should be noted that the application of any of the various embodiments of the invention described above is not limited to the production phase of natural resource recovery operations. For example, a significant amount of fluid energy is available during fracturing operations, and a similar device may be used for distributed sensor networks or other applications requiring energy downhole, based on the energy harvesting principles described above. Another possible application is to use this Energy Harvester inside an oil/gas pipeline. Another application outside the oil industry could be placing these devices along currents in rivers, water pipelines, sewers, wind passages, and any other flow that can induce vibrations and therefore shaking the module that transforms kinetic energy into electric one.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for converting kinetic energy to electrical energy comprising:
   an energy conversion module having an attachment member and first and second components which provide electrical energy when moved relative to each other, the first component being fixed in position relative to the attachment member and the second component being free to move in at least one dimension within a predetermined range relative to the attachment member;
   an anchor that is fixed in place when deployed; and
   a flexure member connecting the anchor with the energy conversion module, the flexure characterized by mechanical properties that permit the energy conversion module to move in an oscillatory manner in response to external stimuli, whereby the first and second components are moved relative to each other and electrical energy is produced.

2. The apparatus of claim 1 wherein the flexure member is defined by mechanical properties that permit oscillatory movement in response to vibrations from the environment.

3. The apparatus of claim 1 wherein the flexure member is defined by mechanical properties that permit oscillatory movement in response to fluid flow in the environment.

4. The apparatus of claim 1 wherein the first component includes a coil and the second component includes a magnet.

5. The apparatus of claim 1 wherein the first component includes a magnet and the second component includes a coil.

6. The apparatus of claim 1 further including at least one component selected from the group consisting of an energy storage module, a data collection device, and a transmitter.

7. A method for converting kinetic energy to electrical energy comprising:
   with an energy conversion module held in place by an anchor, and connected to the anchor by a flexure member, translating environmental kinetic energy into motion of a first component relative to a second component to induce generation of electrical energy, the first component being fixed in position relative to an attachment member of the energy conversion module and the second component being free to move in at least one dimension within a predetermined range relative to the attachment member, the flexure characterized by mechanical properties that permit the energy conversion module to move in an oscillatory manner in response to external stimuli, whereby the first and second components are moved relative to each other and electrical energy is produced.

8. The method of claim 7 including the step moving the flexure member in an oscillatory manner in response to vibrations from the environment.

9. The method of claim 7 including the step moving the flexure member in an oscillatory manner in response to fluid flow in the environment.

10. The method of claim 7 including the step of mounting the energy conversion module in a secondary flow path distinct from a primary flow path.

11. The method of claim 7 including the step of storing energy with an energy storage module.

12. The method of claim 7 further including the step of utilizing the electrical energy to collect data.

13. The method of claim 7 further including the step of utilizing the electrical energy to transmit a signal.

14. Apparatus for converting kinetic energy to electrical energy comprising:
- an energy conversion module having an attachment member and first and second components which provide electrical energy when moved relative to each other, the first component being fixed in position relative to the attachment member;
- an anchor that is fixed in place when deployed;
- a rigid flexure member connecting the anchor with the energy conversion module; and
- a compliant membrane attached to the second component, the compliant membrane characterized by mechanical properties that permit movement in an oscillatory manner in response to external stimuli, whereby the first and second components are moved relative to each other and electrical energy is produced.

15. The apparatus of claim 14 wherein the compliant membrane interferes with fluid flow, thereby inducing oscillatory movement.

16. The apparatus of claim 14 wherein the first component includes a coil and the second component includes a magnet.

17. The apparatus of claim 14 wherein the first component includes a magnet and the second component includes a coil.

18. The apparatus of claim 14 further including at least one component selected from the group consisting of an energy storage module, a data collection device, and a transmitter.

19. A method for converting kinetic energy to electrical energy comprising:
- with an energy conversion module held in place by an anchor, and connected to the anchor by a rigid flexure member, translating environmental kinetic energy into motion of a first component relative to a second component to induce generation of electrical energy, the first component being fixed in position relative to an attachment member of the energy conversion module and the second component being attached to a compliant membrane characterized by mechanical properties that permit the energy second component to move in an oscillatory manner in response to external stimuli, whereby the first and second components are moved relative to each other and electrical energy is produced.

20. The method of claim 19 including the further step of the compliant membrane moving in an oscillatory manner in response to fluid flow in the environment.

21. The method of claim 19 including the step of mounting the energy conversion module in a secondary flow path distinct from a primary flow path.

22. The method of claim 19 including the step of storing energy with an energy storage module.

23. The method of claim 19 further including the step of utilizing the electrical energy to collect data about the characteristics of the environment surrounding the energy harvesting system.

24. The method of claim 19 further including the step of utilizing the electrical energy to transmit a signal.

* * * * *